United States Patent

Percec et al.

[11] Patent Number: 4,673,717
[45] Date of Patent: Jun. 16, 1987

[54] PROCESS FOR THE MODIFICATION OF AROMATIC POLYMERS VIA FRIEDEL-CRAFTS REACTIONS TO PRODUCE NOVEL POLYMERS AND THE USE THEREOF

[75] Inventors: Elena S. Percec, Pepper Pike; George S. Li, Macedonia, both of Ohio

[73] Assignee: Standard Oil Company, Cleveland, Ohio

[21] Appl. No.: 824,129

[22] Filed: Jan. 30, 1986

Related U.S. Application Data

[62] Division of Ser. No. 657,137, Oct. 3, 1984, Pat. No. 4,596,860.

[51] Int. Cl.$^4$ .................... C08G 65/48; C08L 71/04
[52] U.S. Cl. .................... 525/390; 525/397; 525/462; 525/466; 525/467; 525/537; 525/905
[58] Field of Search ............ 525/462, 390, 537, 467, 525/905, 397, 466

[56] References Cited

U.S. PATENT DOCUMENTS

| | | | |
|---|---|---|---|
| 3,350,844 | 11/1967 | Robb | 55/16 |
| 3,780,496 | 12/1973 | Ward, III et al. | 55/16 |
| 4,427,419 | 1/1984 | Li | 55/16 |
| 4,431,793 | 2/1984 | Rosenquist | 528/198 |
| 4,488,886 | 12/1984 | Zampini | 55/158 |

*Primary Examiner*—Theodore E. Pertilla
*Attorney, Agent, or Firm*—Larry W. Evans

[57] ABSTRACT

A process for the addition of pendant groups to polyarylenes comprises the steps of charging a reaction vessel with a solution of a polyarylene and a Friedel-Crafts catalysts; said polyarylene having the formula

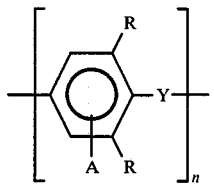

adding to the reaction vessel a pendant forming group G, wherein G is selected from the group consisting of sulfonyl halides, sulfonamide halides, alkylhalides, acylhalides and phosphorus acid halides; heating the contents of the reaction vessel to form a substituted polyarylene having the formula

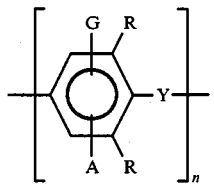

and thereafter recovering the substituted polyarylene. The substituted polyarylenes are novel and have utility as a semipermeable membrane and a process for the separation of gases therewith is also provided.

2 Claims, No Drawings

PROCESS FOR THE MODIFICATION OF AROMATIC POLYMERS VIA FRIEDEL-CRAFTS REACTIONS TO PRODUCE NOVEL POLYMERS AND THE USE THEREOF

This application is a division of application Ser. No. 657,138, filed Oct. 3, 1984, now U.S. Pat. No. 4,596,860.

TECHNICAL FIELD

This invention relates to the synthesis of aromatic polymers containing pendant aromatic sulfone, sulfonamide, alkyl, acyl or phosphorus groups. Semipermeable membranes can be prepared from these polymers and used to effect gas and liquid separations. These membranes have improved permselectivity over polyarylethers and polysulfones.

BACKGROUND ART

The art is replete with teachings describing various semipermeable membranes, their preparation and use. U.S. Pat. No. 3,350,844 teaches the enrichment of gases by permeation through a thin permeable film or membrane prepared from a polyarylene oxide film. U.S. Pat. No. 3,780,496 teaches the use of sulfonated polyxylylene oxide membranes to separate helium, hydrogen and oxygen from gas mixtures.

While the membranes of the above teachings and others all display some level of utility, there exists a continuing search for new membranes and new applications for both new and known membranes. One application where the use of membrane technology may prove beneficial is in the separation of gaseous carbon dioxide-methane mixtures into enriched fractions of their constituent parts. Natural gas is generally found in combination with carbon dioxide. Removal of the carbon dioxide from the natural gas is desirable because it results in both a product (purified natural gas) of greater commercial worth and it provides purified carbon dioxide useful for other applications, such as enhanced oil recovery. Conventional separation processes generally employ cryogenic methods which are relatively energy intensive.

A semipermeable membrane comprising polyarylenes containing alkyl and aryl sulfone radicals and the use thereof is set forth in a copending application, U.S. Ser. No. 570,976, now U.S. Pat. No. 4,521,224, commonly owned by the Assignee of record herein. Unlike the polymer forming the membranes of that invention, the present invention discloses, in addition, polymers containing other groups such as alkyl, aryls and ring halogens.

DISCLOSURE OF THE INVENTION

In general, the process of the present invention comprises the steps of charging a reaction vessel with a solution of a polyarylene and a Friedel-Crafts catalyst, said polyarylene having the formula

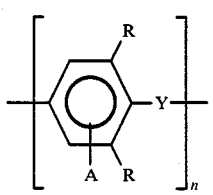
(I)

where each R is independently a $C_1$ to $C_8$ aliphatic or a $C_5$ to $C_7$ cycloaliphatic radical or an aryl radical having the formula

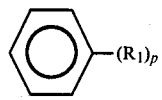
(II)

where each $R_1$ is independently a $C_1$ to $C_8$ aliphatic radical and p is an integer of 0 to 4, each radical being free of a tertiary alpha-carbon atom; A is hydrogen, halogen, an aliphatic or an aryl radical; Y is a divalent oxygen or sulfur atom or a carbonate group and n is an integer of from about 75 to about 10,000; adding to the reaction vessel a pendant forming group G, wherein G is selected from the group consisting of sulfonyl halides having the formula

(III)

where X is a halogen and $R_2$ is a $C_1$ to $C_{20}$ aliphatic, an aryl radical of the formula

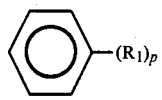

or a naphtyl radical;
a sulfonamide halide having the formula

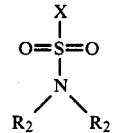
(IV)

where $R_2$ can be the same or different; alkylhalides having the formula

$R_3$—X (V)

where X is a halogen and $R_3$ is a $C_1$ to $C_{20}$ aliphatic radical;
acylhalides having the formula

(VI)

where X is a halogen and $R_4$ is a $C_1$ to $C_{20}$ aliphatic or an aryl radical of the formula

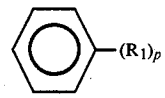

and,
phosphorus acid halides having the formula

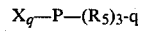
$X_q$—P—$(R_5)_{3-q}$ (VII)

where X is a halogen; $R_5$ is $R_4$ and/or $O-R_4$ and q is an integer of from 1 to 3;

heating the contents of said reaction vessel to form a substituted polyarylene having the formula

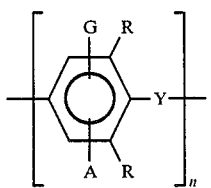
(VIII)

where G is present in at least five percent of the polyarylene units and R, A, Y, G and n are as described and, thereafter recovering the substituted polyarylene.

Novel substituted polyarylene polymers having the formula

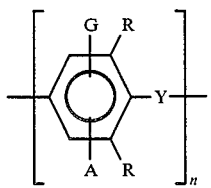
(VIII)

result from practice of the foregoing process. In this formula, each R is indpendently a $C_1$ to $C_8$ aliphatic or a $C_5$ to $C_7$ cycloaliphatic radical, an aryl radical having the formula

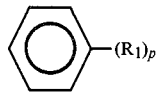
(II)

where each $R_1$ is independently a $C_1$ to $C_8$ aliphatic radical and p is an integer of 0 to 4, each radical being free of a tertiary alpha-carbon atom; A is hydrogen, halogen, an aliphatic or an aryl radical; Y is a divalent oxygen or sulfur atom or a carbonate group; n is an integer of from about 75 to about 10,000 and G is present in at least five percent of the polyarylene unit.

The pendant groups G are selected from the group consisting of sulfonyls having the formula

(IIIa)

where $R_{2a}$ is a $C_1$ to $C_{20}$ aliphatic or a napthyl radical; sulfonamides having the formula

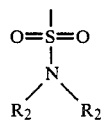
(IV)

where $R_2$ can be the same or different; alkyls having the formula

(Va)

where $R_3$ is a $C_1$ to $C_{20}$ aliphatic radical; acyls having the formula

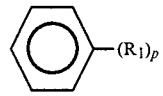
(VIa)

where $R_4$ is a $C_1$ to $C_{20}$ aliphatic or an aryl radical of the formula

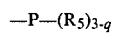
(II)

and, phsophorus groups having the formula $$-P-(R_5)_{3-q} \quad (VIIa)$$

where $R_5$ is $R_4$ and/or $O-R_4$ and q is an integer of from 1 to 3.

The foregoing substituted polymers having utility as semipermeable membranes and the present invention also provides a process for the separation of gases from a mixture containing at least two gases into two fractions, one fraction being enriched with at least one of the gases and the other fraction be depleted in the same. The process is practiced by contacting the gaseous mixture with the novel semipermeable membrane in such a manner that a portion of the gaseous mixture selectively passes through the membrane resulting in the enriched fraction being on one side of the membrane and the depleted fraction being on the other side of the membrane.

PREFERRED EMBODIMENT FOR CARRYING OUT THE INVENTION

The process for the addition of pendant groups G to aromatic polymers is accomplished in a relatively simple one step reaction as follows:

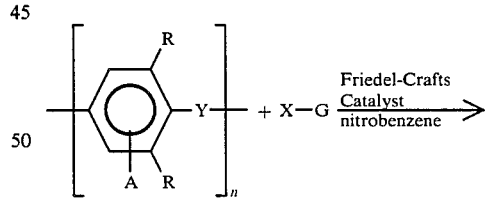

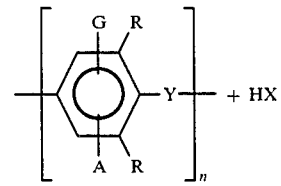

As noted above, Y can be divalent oxygen, —O—, divalent sulfur, —S—, or a carbonate group

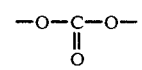

The definition of Y can vary from arylene unit to arylene unit and thus a polymer of formula I can contain all three linkages although preferably the X linkage has the same definition throughout the polymer, i.e., all carbonate, all oxygen or all sulfur. Divalent oxygen is the preferred definition of Y.

Typical groups represented by A in formula I besides hydrogen include halogens, i.e., F, Cl, Br and I, the apliphatics described in conjunction with R and aryl radicals such as phenyl, tolyl, xylenyl, phenethyl and the like.

Typical aliphatic groups represented by R in formula I and the foregoing equation include methyl, ethyl, propyl, hexyl, cyclohexyl, cyclohexenyl and the like. Where R is an aryl, as described in formula II, nonpolymeric aryl radicals such as phenyl, tolyl, xylenyl, phenethyl and the like are contemplated. Thus, suitable compounds can be unsubstituted aryl, where p =0, or alkylaryl or arylalkyl radicals. If desired, R can contain inert substituents, i.e., substituents that are nonreactive with the components of the permeant under separation conditions, although preferably R is free of any such substituents. R is preferably a $C_1$ to $C_4$ alkyl radical and most preferably a methyl radical.

$R_1$ in the definition of formula II shares the $C_1$ to $C_8$ aliphatics discussed in conjunction with R hereinabove. $R_2$ in the definition of formula III can be any linear or branched hydrocarbon having from one to about 20 carbon atoms including saturated compounds such as methyl, ethyl, propyl, butyl, t-butyl, octyl, hexadecyl and the like, as well as unsaturated, e.g., alkenes, alkynes and the like.

$R_2$ can also be an aryl radical of the formula

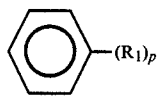
(II)

as noted hereinabove where each $R_1$ is independently a $C_1$ to $C_8$ aliphatic radical, and p is an integer of 0 to 4. If p is a positive integer (greater than 0), preferably it is 1 or 2 and then $R_1$ is preferably a $C_1$ to $C_3$ alkyl radical.

$R_2$ can thus also be any nonpolymeric aryl radical, such as phenyl, tolyl, xylenyl and phenethyl. By nonpolymeric is meant that the aryl radical is not part of a polymer chain, i.e., the aryl radical of an arylene unit of another polymer strand of formula I or in other words, the sulfone group for instance, O=S=O, does not link two independent polymer strands. However, the aryl radical here includes multi-ring compounds such as biphenyl, diphenyloxide, etc. As noted, $R_2$ can also be naphthyl. Preferred aryl radicals are phenyl, tolyl, xylenyl and phenethyl.

$R_3$ in the definition of formula V shares the $C_1$ to $C_{20}$ aliphatics discussed in conjunction with $R_2$ hereinabove. Similarly, $R_4$ in the definition of formula VI shares both the $C_1$ to $C_{20}$ aliphatics as well as the aryl radicals of formula II, discussed in conjuntion with $R_2$ hereinabove. Suitable acylhalides include, for instance, propionyl halide, butyryl chloride, lauroyl chloride, myristoyl chloride, palmitoyl chloride, phenylacetyl chloride, toluoyl chloride and the like.

Suitable sulfonamide halides include compounds such as dimethylsulfamoyl chloride. Suitable phosphorus acid halides include phosphorus trichloride, ethyl chlorophosphite, diphenyl chlorophosphite and the like.

The number of pendant groups G introduced by the synthesis of the present invention is at least about five percent, or 0.05 mole, that is, one out of 20 of the polyarylene units will contain a G group. As an upper limit, 200 percent, or 2.0 mole, is possible, that is, every polyarylene unit will contain two groups G. Preferably, 25 to 100 percent (0.25 to 1.0 mole) will be present, or from one group G per four polyarylene units to one group G per polyarylene unit.

Thus, the foregoing process of the present invention allows for the sulfonylation, sulfamylation, alkylation, acylation or phosphorylation of polyarylenes particularly polyarylene ethers, where Y is oxygen. Polyphenylene oxide (PPO) is a preferred material where both R groups are methyl and the A group is hydrogen. The weight average molecular weight of this material is typically at least about 20,000 and preferably at least about 50,000. The maximum weight average molecular weight is limited only by practical considerations, particularly the film-forming ability of the polymer, but typically it does exceed about 1,000,000 weight average molecular weight. These polymers and their preparation are defined at length in the above-referenced U.S. Pat. No. 3,350,844, the subject matter of which is incorporated herein by reference.

The foregoing polymer can contain another organic group or ring. Halogenation can be provided in a conventional modification and as such the technique by which this is achieved does not constitute a novel aspect of the present invention. Similarly, the addition of other organic groups is not a novel aspect of the process inasmuch as they can be provided either by monomer selection or by employing modification reactions.

In order to prepare a polymer having a repeating structural unit of formula I, a Friedel-Crafts synthesis is employed. The reaction takes place by contacting a solution of polyphenylene oxide, for instance, with sulfonyl halides, sulfamoyl halides, alkyl halides, acyl halides or phosphorus acid halides as desired, e.g., iodides, bromides, chlorides, fluorides in the presence of a Lewis acid ($AlCl_3$, $SnCl_4$, $FeCl_3$ and the like). Halogenated solvents or polar solvents, particularly nitrobenzene are employed for the reaction. Typical reaction temperatures range between 0° and 100° C.; typical reaction times are from a few hours, e.g., about four to 16 hours. Reaction mixtures are usually purged with nitrogen to aid in the removal of hydrogen halide by-products.

The process of the present invention provides for the novel synthesis of various substituted polyarylene polymers as described hereinabove. The majority of these polymers are believed to be novel, the sole exception being those polymers containing the aryl sulfonyl group G where the aryl has the formula

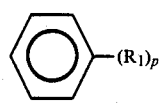

as set forth hereinabove. The synthesis of such polymers has been set forth in U.S. Pat. No. 4,427,419, owned by the Assignee of record and was performed by contacting PPO with chlorosulfonic acid and then an aromatic compound such as benzene or toluene. That process is not a Friedel-Crafts technique nor is it useful for synthesizing sulfones containing naphthyl radicals. For naphthyl as well as alkyl moeities, the synthesis process of the present invention must be employed and, therefore, substituted polymers containing these groups are believed to be novel.

Semipermeable membranes comprising the novel aromatic polymer synthesized herein can be manufactured by any conventional method. In one embodiment, the polymer is dissolved in a suitable solvent to form about a five to about a 20, preferably a seven to about a 15, weight percent solution. Generally any polar solvent can be employed with chloroform, dimethylformamide, dimethylsulfoxide, dimethylacetamide, acetone and methylethyl ketone being exemplary. The solution is then poured over a clean glass plate and spread evenly to a uniform thickness with the aid of a doctor blade. The membranes are then air dried, removed from the glass plate and further dried in air under ambient conditions for a suitable period of time, generally in excess of 24 hours. In other embodiments, these membranes can be manufactured by the various laboratory and commercial techniques known in the art. These membranes can also be manufactured in structures other than films, such as hollow fibers.

The membranes of this invention can be cast at any desirable thickness although membranes having a thickness between 25 mils (1 mil equals 25 micrometers) and 1,000 angstroms, preferably between 10 mils and 1,000 angstroms. These membranes demonstrate good permeability, durability, flexibility, strength and corrosion resistance.

The process of this invention directed toward gas separations is suitable for separating any one of a number of different gases such as hydrogen, helium, nitrogen, oxygen, carbon monoxide, carbon dioxide, hydrogen sulfide, ammonia, water (vapor) and $C_1$ to $C_4$ hydrocarbons from mixtures containing the same. Typical gas mixtures where separation is desirable include $H_2/N_2$; $H_2/CO$; $H2/C_1$ to $C_4$; $H_2/O_2$; $H_2/NH_3$; $CO_2/C_1$ to $C_4$; $CO_2/N_2$; $H_2S/C_1$ to $C_4$; $O_2/N_2$; $N_2/NH_3$; $He/C_1$ to $C_4$; $H_2S/C_1$ to $C_4$ and $H_2O/C_1$ to $C_4$. The membrane can also be employed for the separation of mixtures comprising three gases or more. It is to be understood that not all gas pairs or mixtures will be separated optimally over a given membrane of the present invention. So long as the membrane exhibits a selectivity for at least one gas in a mixture, it has utility for that particular mixture. The semipermeable membranes of this invention find particular utility for the separation of gaseous carbon dioxide-methane mixtures into their constituent parts, i.e., enriched fractions of carbon dioxide and methane.

These membranes are also useful for separating liquid mixtures, such as ethanol-water, water-aldehyde, salt water, carboxylic acid-water and the like. If used to separate liquid mixtures into their constituent parts, then these membranes are used in the same manner as known membranes for these separations. Furthermore, these membranes can be used in any one of a number of different manners including reverse osmosis and pervaporation, the latter being a combination of permeation and evaporation.

The following examples are illustrative of specific embodiments of this invention and unless indicated to the contrary, all parts and percentages are by weight.

SPECIFIC EMBODIMENTS

Polymer Preparation:

The polymers employed herein to manufacture the membranes were all based upon polyphenylene oxide having a weight average molecular weight of about 46,000. Modification of the polymer by Friedel-Crafts according to the process of the present invention commenced with the introduction of 200 ml of a 5 percent solution of PPO in nitrobenzene and 10.926 g of $AlCl_3$ into a 500 ml three necked flask equipped with a mechanical stirrer, condenser and dropping funnel. 15.63 g of p-toluenesulfonyl chloride dissolved in 56 ml nitrobenzene was then added over 30 minutes at 10° C. Following the addition, the dropping funnel was removed and a dip tube was employed to purge the reaction mixture with dry $N_2$ in order to drive off HCl generated. The flask was heated over a water bath to 80° C. and maintained there for 270 minutes. At the end of this time, the reaction mixture was then washed with water until the pH was neutral following which the separated polymer solution was dried on $MgSO_4$, filtered and precipitated in methanol.

The membrane tested herein as Example No. 1 was prepared from the arylsulfonated polyphenylene oxide polymers prepared by the foregoing description. The membrane itself was prepared by mixing a dilute (about 5 to about 20 weight percent) solution of polymer prepared above in a suitable solvent, typically about 7 weight percent poured over a clean glass plate and spread evenly to a uniform thickness with the aid of a doctor blade, air dried, removed from the glass plate, and further dried in air at ambient conditions for at least 24 hours. For purposes of comparison an unmodified PPO membrane film was also cast as Example No. 2, a control.

Apparatus and Procedure:

A modified Gilbert cell was used to test the permeation of the two polymer films. The test side was exposed to a carbon dioxide/methane/nitrogen mixture in a mole ratio of 2.99:32:65. The permeant was picked up by a carrier gas, helium, and injected intermittently through a sample valve into a GC column for analysis. The experiments were conducted at 23° C., the partial pressure of the test gas on the feed side was 29.7 psi (0.21 MPa) and the partial pressure of the product gas on the permeant side was about 0 and purged with 29.77 psi (0.21 MPa) helium at a flow rate much in excess of the permeation rate. The area of the test membrane was 45.8 square cm. The film thickness was about 1-2 mils. The carbon dioxide permeability and carbon dioxide/methane selectivity figures are reported in Table I.

TABLE I

| Separation Characteristics of Semipermeable Membranes | | | |
| Ex. No. | Membrane | Selectivity $CO_2/CH_4$ | $\overline{P}_{CO_2}$ |
| --- | --- | --- | --- |
| 1 | Arylsulfonylated PPO | 23 | 75 |
| 2[a] | PPO | 20 | 64 |

[a]Control

Selectivity, as is known, is a comparison of the permeability, $\overline{P}$, of one gas divided by the permeability of the second gas in the mixture. Normally, the less permeable member of the gas pair is placed in the denominator and the selectivity factor will be a number greater than one. Permeability, in turn, is customarily calculated according to the relationship $$\overline{P} = \frac{(cc)(cm)}{(sec)(cm^2)(cmHg)}$$

where cc is the volume of the permeating gas at standard temperature and pressure, cm is the thickness of the membrane, sec is the time in seconds for a given amount of gas to be permeated, cm$^2$ is the area of the membrane and cmHg is the pressure differential over the membrane in cm of mercury. Permeability as such is reported in Barrers, one Barrer being equal to $1 \times 10^{-10}$. Gas pressures on the membranes of this invention can range from about 0.10 to 200 MPa with five to 100 MPa being preferred.

The above data clearly demonstrates the general superiority of membranes formed from aryl sulfonylated polypropylene oxide polymers over polyaryl ethers (PPO). Membranes formed from these modified polyphenylene oxide polymers have also been shown to be essentially impervious to boiling water while membranes formed from sulfonated polyphenylene oxide are generally water swellable.

As stated herein, $R_2$ in the sulfonyl group G can also be non-aromatic, i.e., $C_1$ to $C_{20}$ linear or branched hydrocarbon. By way of example, for Example No. 3 where $R_2$ in the sulfonyl group G is hexadecyl a different procedure was followed which commenced by contacting polyphenylene oxide in nitrobenzene (5 percent solution) in the presence of $AlCl_3$. To this mixture was added 1-hexadecanesulfonyl chloride while nitrogen gas was bubbled therethrough. After a reaction time of six hours at 40° C., the mixture was washed with water, dried on anhydrous $MgSO_4$, filtered and precipitated from methanol.

A membrane was then prepared as described hereinabove and employed for the separation of the $CO_2/CH_4/N_2$ mixture (2.99:32:65). For comparison, a membrane was also again prepared from an unmodified polyphenylene oxide, Selectivity $CO_2/CH_4$ for the hexadecyl sulfonylated polyphenylene oxide membrane was equivalent to the unmodified polymer membrane while $\bar{P}CO_2$ was approximately 20 percent higher, thereby demonstrating the improvement when the membrane comprised a sulfonylated polymer.

G can also be a sulfonamide and can be introduced according to the procedure set forth for Example No. 1. Thus, in order to prepare Example No. 4, 20 g of polyphenylene oxide in nitrobenzene (5 percent solution) was contacted with $AlCl_3$. To this mixture was added 12 g of dimethylsulfamoyl chloride while nitrogen gas was bubbled therethrough. After a reaction time of six hours at 80° C., the mixture was washed with water, dried on anhydrous $MgSO_4$, filtered and precipitated from methanol.

A membrane was then prepared as described previously and employed for the separation of the $CO_2/CH_4/N_2$ mixtures (2.99:32:65). Permeabilities were determined as follows: $\bar{P}CH_4 = 3.31$; $\bar{P}CO_2 = 80.99$; $\bar{P}N_2 = 2.45$. Selectivities were also determined as follows: $\bar{P}CO_2/\bar{P}CH_4 = 24.47$; $\bar{P}CO_2/\bar{P}N_2 = 33.06$. The polymer film was found to possess good strength and some elasticity. Comparisons with the unmodified PPO, Example No. 2, revealed a 27 percent increase for $\bar{P}CO_2$ and a 22 percent increase for $\bar{P}CO_2/\bar{P}CH_4$ selectivity.

As was also stated hereinabove, the number of pendant groups G introduced onto the polyarylene units can be at least one group G per 20 polyarylene units and is preferably one group G per four arylene units to two groups G per arylene unit. Stated alternatively, the groups G can be present in an amount of from about five percent (0.05 mole) to about 200 percent (2.0 mole), based upon the number of polyarylene units.

In order to demonstrate that the number of pendant groups, introduced according to the process of the subject invention, could vary between 25 to 200 percent, reference should be made to Table II which provides reactant and catalyst ratios for two catalysts, with reaction conditions. Polyphenylene oxide PPO was again modified with toluenesulfonyl chloride, $RSO_2Cl$. It will be observed that both catalysts $AlCl_3$ and $FeCl_3$ were readily employed.

TABLE II

| | Control Over the Number of Sulfonyl Groups Added Per PPO Backbone Unit | | | | | |
|---|---|---|---|---|---|---|
| Ex. No. | PPO/RSO$_2$Cl (mole/mole) | RSO$_2$CL/AlCl$_3$ (mole/mole) | RSO$_2$Cl/FeCl$_3$ (g/g) | Temp °C. (min. | max.) | Time (min.) |
| 5 | 1/0.25 | 1/0.275 | — | 15 | 80 | 360 |
| 6 | 1/0.25 | — | 100/1 | 15 | 80 | 360 |
| 7 | 1/0.50 | 1/0.55 | — | 15 | 80 | 360 |
| 8 | 1/0.50 | — | 100/1 | 15 | 80 | 360 |
| 9 | 1/1 | 1/1.1 | — | 15 | 80 | 360 |
| 10 | 1/1 | — | 100/1 | 15 | 80 | 360 |
| 11 | 1/1.5 | 1.165 | — | 15 | 80 | 390 |
| 12 | 1/1.5 | — | 100/2 | 15 | 80 | 390 |
| 13 | 1/2 | 1/2.2 | — | 15 | 90 | 480 |
| 14 | 1/2 | — | 100/4 | 15 | 90 | 480 |

The compositions of Examples No. 5-14 were determined via elemental analysis and NMR and were found to be one sulfonyl per four arylene units, Examples No. 5 and 6; one sulfonyl per two arylene units, Examples No. 7 and 8; one sulfonyl per single arylene unit, Examples No. 9 and 10; three sulfonyls per two arylene units, Examples No. 11 and 12, and two sulfonyls per single arylene unit, Examples No. 13 and 14.

Thus, it has been demonstrated herein that the process of the present invention is useful for the synthesis of sulfonyl pendant groups onto polyaryl ethers via Friedel-Crafts reactions. The novel polymers resulting therefrom have good solubilities, enhancing the possibility of casting films as polymer membranes from a large number of solvents many of which would not be useful for the dissolution of unmodified PPO. The improved solubilities, in turn, increase the range of casting solution concentrations which can improve the yield of performance composite membranes in the manufacturing process.

For example, PPO is commonly dissolved in chloroform and, in the process of forming hollow fibers of the membrane, the filament is coagulated in methanol, a nonsolvent for PPO. By employing a modified PPO according to the present invention, polar organic solvents can be selected, such as dimethyl formamide (DMF), dimethylsulfoxide (DMSO), dimethylacetamide, N-methyl pyrolidone and the like, and the spun filament can be coagulated in water. The advantages include better control over pore size because the polymer solvents are less volatile than chloroform. In the formation of films, for instance, very rapid evaporation rates produce surface cooling leading to localized precipitation and nonuniform, stressed film. Also, as a coagulant, water is cheaper and safer than methanol.

It is to be understood that the novel polymers and permselective membranes prepared therefrom can comprise other components than the sulfonylated PPO exemplified herein, the examples having been provided merely to demonstrate practice of the subject invention. Those skilled in the art may readily select other polyarylenes and pendant groups, e.g., alkyls, acyls and phosphonyls according to the disclosure made hereinabove.

Lastly, although operability of the process to separate $CO_2$ from $CH_4$ and $N_2$ has been demonstrated herein, the membranes of the present invention and process for separating gases therewith can be employed with other gas mixtures so long as the members of a given pair have different permeability rates from each other.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. Novel substituted polyarylene polymers having the formula

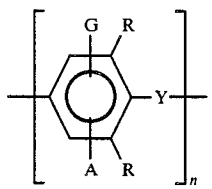

wherein each R is independently a $C_1$ to $C_8$ aliphatic or a $C_5$ to $C_7$ cycloaliphatic radical, an aryl radical having the formula

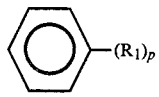

wherein each $R_1$ is independently a $C_1$ to $C_8$ aliphatic radical and p is an integer of 0 to 4, each radical being free of a tertiary alpha-carbon atom; A is hydrogen, halogen, an aliphatic or an aryl radical; Y is a divalent oxygen or sulfur atom or a carbonate group; n is an integer of from about 75 to about 10,000; and wherein G is present in at least five percent of said polyarylene units and is selected from the group consisting of alkyl sulfonyls having the formula

where $R_{2a}$ is a $C_1$ to $C_{20}$ aliphatic radical and sulfonamides having the formula

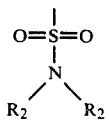

where $R_2$ is a $C_1$ to $C_{20}$ aliphatic or aryl radical of the formula

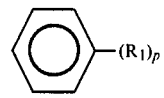

or a naphthyl radical where $R_1$ and p are as described above.

2. Novel substituted polyarylene polymers having the formula

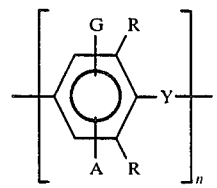

wherein each R is independently a $C_1$ to $C_8$ aliphatic or a $C_5$ to $C_7$ cycloaliphatic radical, an aryl radical having the formula

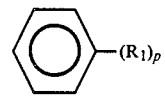

wherein each $R_1$ is independently a $C_1$ to $C_8$ aliphatic radical and p is an integer of 0 to 4, each radical being free of tertiary alpha-carbon atom; A is hydrogen, halogen, an aliphatic or an aryl radical; Y is a divalent oxygen or sulfur atom or a carbonate group; n is an integer of from about 75 to about 10,000; and wherein G is present in at least five percent of said polyarylene units and is selected from the group consisting of phosphorus groups having the formula

where $R_5$ is selected from the group consisting of $R_4$ and $O-R_4$ and mixtures thereof where $R_4$ is a $C_1$ to $C_{20}$ aliphatic or an aryl radical of the formula

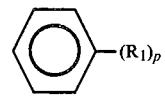

where $R_1$ and p are as defined in claim 1 and q is an integer of from 1 to 3.

* * * * *